(12) United States Patent
Anderson et al.

(10) Patent No.: US 9,478,250 B1
(45) Date of Patent: Oct. 25, 2016

(54) DATA STORAGE COMPONENT TESTING SYSTEM

(71) Applicant: Seagate Technology LLC, Cupertino, CA (US)

(72) Inventors: Ronald Eldon Anderson, Lakeville, MN (US); Michael Louis Rancour, Minnetonka, MN (US); Brett Robert Herdendorf, Mound, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/695,505

(22) Filed: Apr. 24, 2015

(51) Int. Cl.
G11B 20/18 (2006.01)

(52) U.S. Cl.
CPC .................. G11B 20/1816 (2013.01)

(58) Field of Classification Search
None
See application file for complete search history.

(56) References Cited

U.S. PATENT DOCUMENTS

| | | | |
|---|---|---|---|
| 5,787,057 A * | 7/1998 | Fan | G11B 7/268 369/30.31 |
| 5,894,376 A * | 4/1999 | Rinard | G11B 15/686 360/130.23 |
| 6,271,985 B1 * | 8/2001 | Ishikawa | G11B 23/38 360/99.18 |
| 6,286,362 B1 * | 9/2001 | Coffman | G01M 3/202 73/40.7 |
| 6,526,841 B1 | 3/2003 | Wanek et al. | |
| 7,076,391 B1 | 7/2006 | Pakzad et al. | |
| 7,248,039 B2 | 7/2007 | Green et al. | |
| 7,295,002 B2 | 11/2007 | Guzik et al. | |
| 7,634,375 B1 | 12/2009 | Pakzad et al. | |
| 7,778,031 B1 | 8/2010 | Merrow et al. | |
| 7,797,578 B2 | 9/2010 | Co | |
| 7,836,603 B2 | 11/2010 | Guzik et al. | |
| 7,848,106 B2 | 12/2010 | Merrow | |
| 8,102,173 B2 | 1/2012 | Merrow | |
| 8,189,334 B2 | 5/2012 | Campbell et al. | |
| 8,238,099 B2 | 8/2012 | Merrow | |
| 8,432,630 B1 * | 4/2013 | Lin | G11B 5/455 324/212 |
| 8,873,200 B2 | 10/2014 | Warn et al. | |
| 2002/0035865 A1 * | 3/2002 | Luk | G01N 3/30 73/12.01 |
| 2009/0142169 A1 * | 6/2009 | Garcia | B25J 15/0052 414/222.02 |
| 2009/0153994 A1 * | 6/2009 | Merrow | G06F 1/187 360/31 |
| 2009/0262445 A1 | 10/2009 | Noble et al. | |
| 2009/0297328 A1 * | 12/2009 | Slocum, III | B25J 9/0093 414/806 |
| 2011/0156741 A1 * | 6/2011 | Scocchetti | G01R 31/2891 324/756.07 |
| 2012/0321435 A1 | 12/2012 | Truebenbach | |
| 2013/0092700 A1 | 4/2013 | Braunstein | |
| 2014/0290023 A1 * | 10/2014 | Kay | G11B 33/128 29/407.01 |

* cited by examiner

*Primary Examiner* — Peter Vincent Agustin
(74) *Attorney, Agent, or Firm* — Hall Estill Attorneys at Law

(57) ABSTRACT

A testing system that is capable of testing individual data storage components may have testing, loader, and exchange assemblies with the testing assembly having a plurality of test slots each having long and short axes. The loader assembly can be configured to transport and install a test deck or data storage device from the exchange assembly to a test slot of the plurality of test slots with a long axis of the test deck continuously aligned with the long axis of the test slot while being transported.

19 Claims, 4 Drawing Sheets

DATA STORAGE COMPONENT TESTING SYSTEM

SUMMARY

In accordance with various embodiments, a data storage component testing system has testing, loader, and exchange assemblies with the testing assembly having a plurality of test slots each having long and short axes. The loader assembly is configured to transport and install a test deck or data storage device from the exchange assembly to a test slot of the plurality of test slots with a long axis of the test deck continuously aligned with the long axis of the test slot while being transported.

DETAILED DESCRIPTION

With increased consumer and industry demand for data capacity, the manufacturing and testing of data storage devices has been stressed. Meanwhile, data storage components, like data storage media, transducing heads, and suspension assemblies, have become more sophisticated, which corresponds with more complicated and time consuming component testing procedures to verify the accuracy and integrity of one or more data storage components. However, more elaborate and/or thorough data storage component testing procedures can decrease the volume of data storage devices being manufactured. Hence, various embodiments are directed to optimizing the efficiency of data storage component testing to allow increased component testing time without decreasing the data storage device manufacturing throughput.

Accordingly, a data storage component can be tested in a testing system having testing, loader, and exchange assemblies where the testing assembly has a plurality of test slots each having long and short axes and the loader assembly transports and installs a test deck or data storage device from the exchange assembly to a test slot of the plurality of test slots with a long axis of the test deck/data storage device continuously aligned with the long axis of the test slot. The continuous alignment of a test deck or data storage device with the test slot eliminates time associated with rotating the test deck/data storage device. Although rotating a test deck/data storage device may only take a couple of seconds, the overall time savings for a testing system having a plurality of testing slots allows the loader assembly to keep each test slot operating with maximum efficiency.

It is noted that data storage components may be tested using a spinstand system in manual or automated embodiments. However, spinstand systems are inefficient as large amounts of unproductive time are spent loading and unloading components to be tested. Also, spinstand testers often require manipulation of the tested component and/or the testing equipment to prepare for a component test. Therefore, spinstand systems do not afford increased data storage component test times by eliminating test component rotation between a test slot and a component exchange assembly, as claimed.

Figure 1:
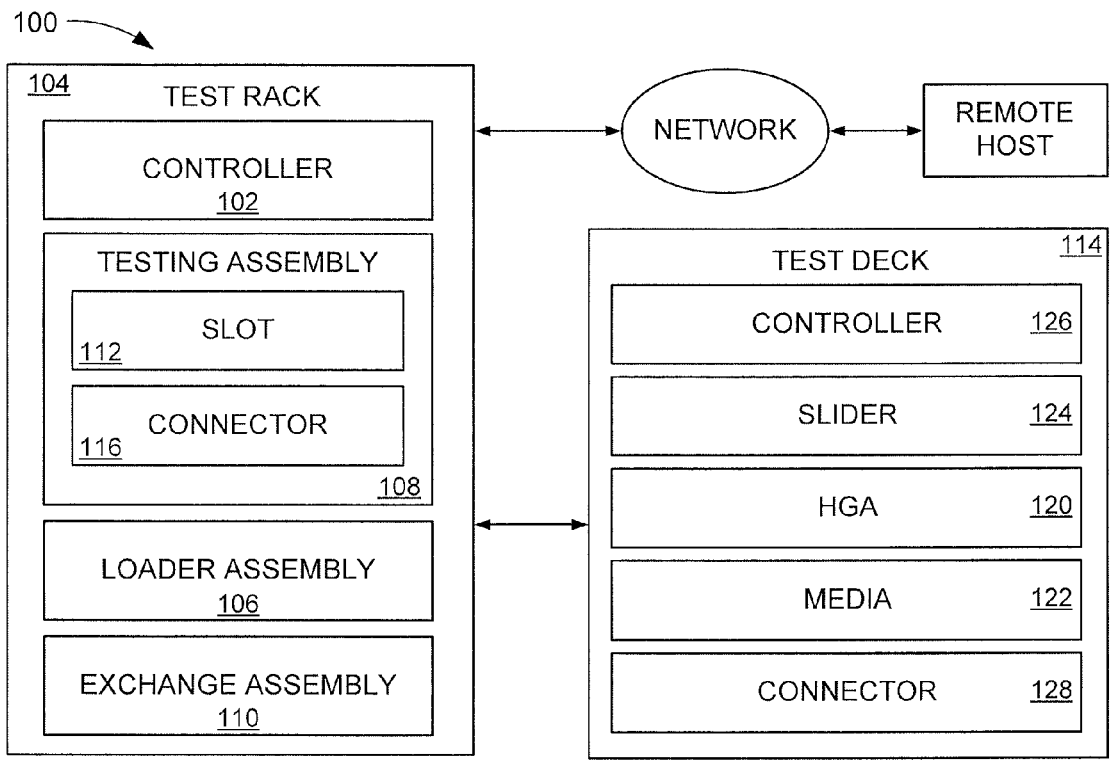
FIG. 1 is a line representation of a portion of an example testing system configured and operated in accordance with some embodiments.

A testing system can be considered modular by having the ability to selectively interchange individual data storage components. FIG. 1 illustrates a block representation of an example modular testing system 100 configured in accordance with various embodiments. The modular testing system 100 has at least one local controller 102 that is housed in a rack 104 along with loader 106, testing 108, and exchange 110 assemblies. The testing assembly 108 has a plurality of test slots 112 that can be arranged vertically and horizontally to efficiently occupy physical space. The various testing slots 112 can have similar or dissimilar sizes and testing capabilities to allow the local controller 102 to simultaneously provide different testing environments for test data storage device components corresponding with different device form factors.

In some embodiments, the test slots 112 are interconnected via a common cooling duct that can be adjusted to regulate the temperature of a test deck 114 engaged within the test slot 112. In other embodiments, at least one test slot 112 has a local temperature control mechanism that allows the local controller 102 to artificially increase, or decrease, the temperature of one or more test decks 114, which can increase the scope of testing that can be carried out within the test slots 112.

The loader assembly 106 can have one or more robotic or manual rails, conveyors, end effectors, and elevators that allow individual test decks 114 to be installed and subsequently removed from the respective test slots 112. It is contemplated that the loader assembly 106 can manipulate the position, pitch, and roll of a test deck 114 to allow complete electrical connection of a test slot connector 116 with a test deck connector 118. The ability to simultaneously engage and disengage multiple different test decks 114 with various test slots 112 in the rack 104 allows for efficient testing of large numbers of data storage device components.

The exchange assembly 110 can be configured with any number of manual or robotic means to engage and open an access port 120 portion of a test deck 114 before replacing one or more components housed within the test deck 114. For example, the exchange assembly 110 can remove and replace a data storage medium 122 and/or a slider assembly 124 or a head gimbal assembly (HGA) in the test deck via the access port 120, which saves testing time and increases testing accuracy over systems that disassemble some, or all, of a testing assembly to interchange data storage device components. That is, the ability to exchange a single data storage device component via the access port 120 provides modular interchangeability that optimizes the efficiency and accuracy of the testing system 100.

Various embodiments configure each test deck 114 with a deck controller 126 that can store at least one testing pattern and/or routine that can be carried out by the test slot 112 to evaluate the quality and accuracy of at least the slider 124 and medium 122. Configuring each test deck 114 with a controller 126 allows the rack controller 104 to more efficiently conduct simultaneous testing of multiple different test decks 114 compared to the rack controller 104 directing different test patterns and routines for various test decks 114. That is, the individual test decks 114 can locally direct testing conditions to the rack controller 102 to allow different test decks 114 to execute different testing conditions, such as test slot 112 temperature, vibration, data writing conditions, reading conditions, transducer fly height, environment gas composition, and environment gas pressure.

It is noted that the test deck 114 is not a functioning data storage device that can be utilized in a hard drive. In accordance with some embodiments, one or more of the slider 124 and medium 122 data storage components are conditioned for testing the quality and accuracy of other data storage components. For example, the data storage medium 122 can be configured with testing parameters, such as data tracks, data density, and data patterns, which are not conducive to hard drive data storage device media that are ready for the input of consumer data. Moreover, each test deck 114 is arranged with a single data medium 122 and slider 124, which would not logically be provided in a consumer-ready data storage device. Hence, although the test deck 114 is enclosed within top and bottom covers that define a sealed or unsealed internal environment like a hard disk drive, the test deck 114 are configured specifically to test one or more data storage components without the ability to store end-user data like a commercial hard disk drive.

Figure 2:
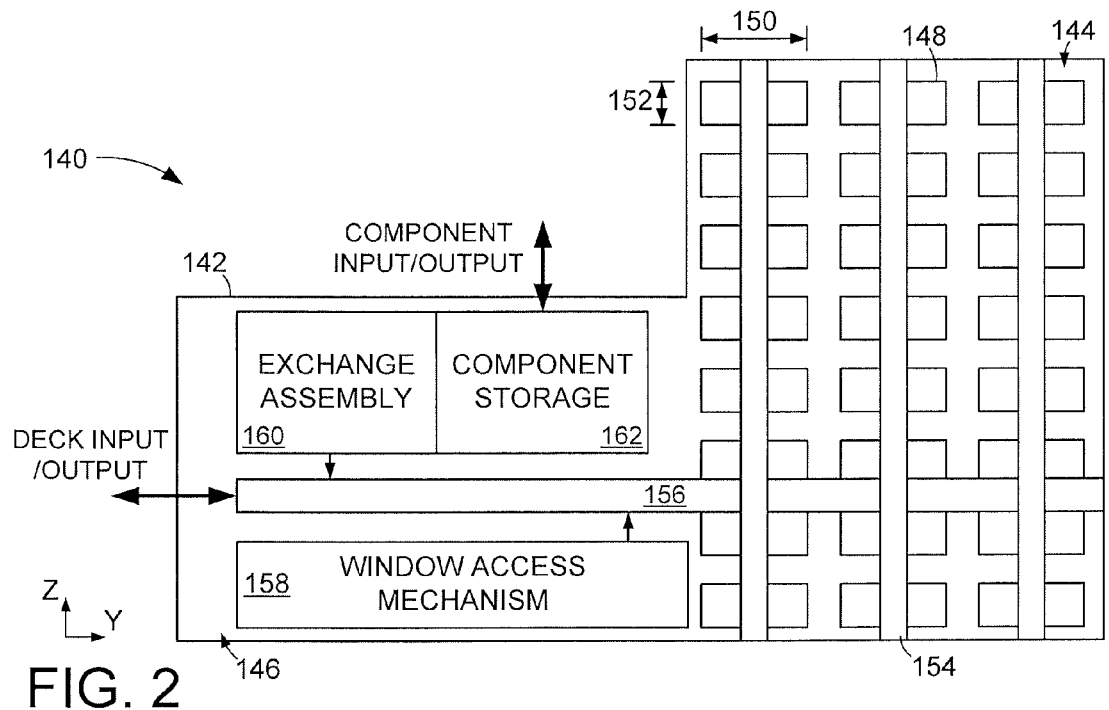
FIG. 2 displays a line representation of a portion of an example data component testing system arranged in accordance with various embodiments.

FIG. 2 displays a line representation of an example data component testing system 140 arranged and operated in accordance with various embodiments to test a plurality of data storage components simultaneously. The testing system 140 is housed within a rigid testing rack 142 that is arranged to provide at least a testing region 144 and an exchange region 146. The testing region 142 can have a plurality of test slots 148 that are arranged in the rack 142 to maximize testing capacity while providing efficient temperature management through natural and artificial airflow.

The test slots 148 of the test region 144 can be similar or dissimilar in structure and operation. That is, test slots 148 can have matching, or different, widths 150 and heights 152 as well as matching, or different, testing components to allow a diverse variety of testing environments for a test deck. For example, a first test slot 148 may have a larger width 150 and/or height 152 than a second test slot 148 in the test region 144 and the first test slot may have components allowing for heating and cooling a test deck while the second test slot may be configured only for cooling a test deck. The ability to configure the various test slots 148 with similar or dissimilar sizes and capabilities, such as changing environmental conditions and sensing testing conditions, allows the testing system 140 to concurrently test under a wide range of different situations.

The assorted test slots 148 are accessed by a loader assembly that comprises one or more locating means 154, such as, but not limited to, belts, conveyors, end effectors, paths, and tracks. In some embodiments, multiple independent locating means 154 communicate with an exchange mechanism 156 to allow a plurality of different test decks to be transported to and from the various test slots 148 simultaneously. The ability to concurrently have multiple different test decks being moved and tested maximizes the efficiency of the testing system 140 and allows the test slots 148 to conduct different testing routines that take different test times without hampering overall testing efficiency.

The exchange mechanism 156 is configured to position a test deck so that a port access mechanism 158 can efficiently open a port portion of the test deck. For example, the exchange mechanism 156 can orient each test deck so that a port portion is aligned with the port access mechanism 158 to allow a door occupying the port portion of the test deck to be moved and/or removed by the port access mechanism 158. The interaction of the test deck with the port access mechanism 158 prepares the test deck to be swapped by the exchange assembly 160. In other words, the port access mechanism 158 opens the test deck to allow the exchange assembly to remove and replace less than all the data storage components of the test deck.

As shown, the exchange assembly 160 can be fed individual data storage components to be tested by a storage region 162. With a plurality of test decks being tested and engaging the exchange assembly 160, the storage region 162 can be configured to organize and correlate the input and output of individual data storage components. For instance, the storage region 162 can correlate the input an untested slider component with a specific test deck while designating a tested slider component as defective or certified and ready for output to data storage device manufacturing.

The capability to process individual data storage components allows the testing system 140 to not only test the function of a data storage component, but also optimize the performance of the data storage component. As a non-limiting example, the testing system 140 can install a single data storage component into multiple different test decks that respectively test different data access conditions, like temperature, and different computing combinations, such as HGA, slider, medium combinations, to discover the optimized data storage environment for that specific data storage component. As such, the testing system 140 goes beyond merely testing for defects and allows for the optimization of computing performance for a data storage component.

Figure 3A:
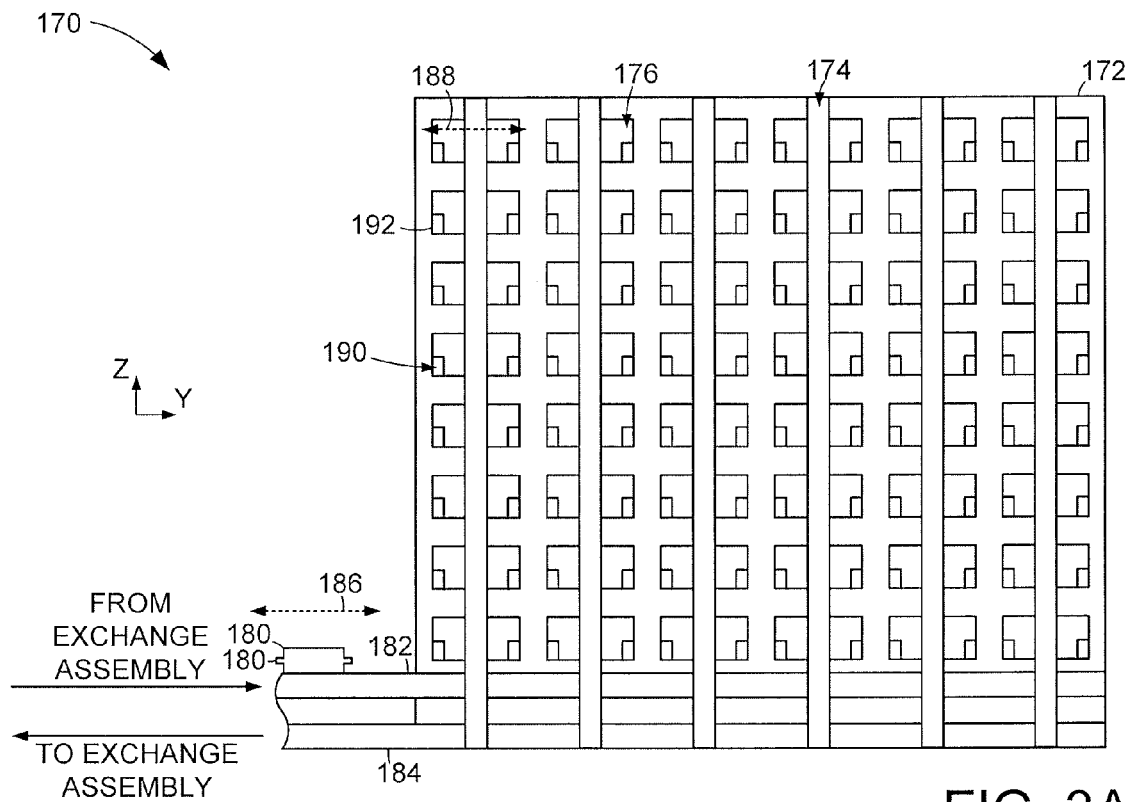
FIGS. 3A and 3B respectively show side and top line representations of portions of an example data storage component testing system.
Figure 3B:
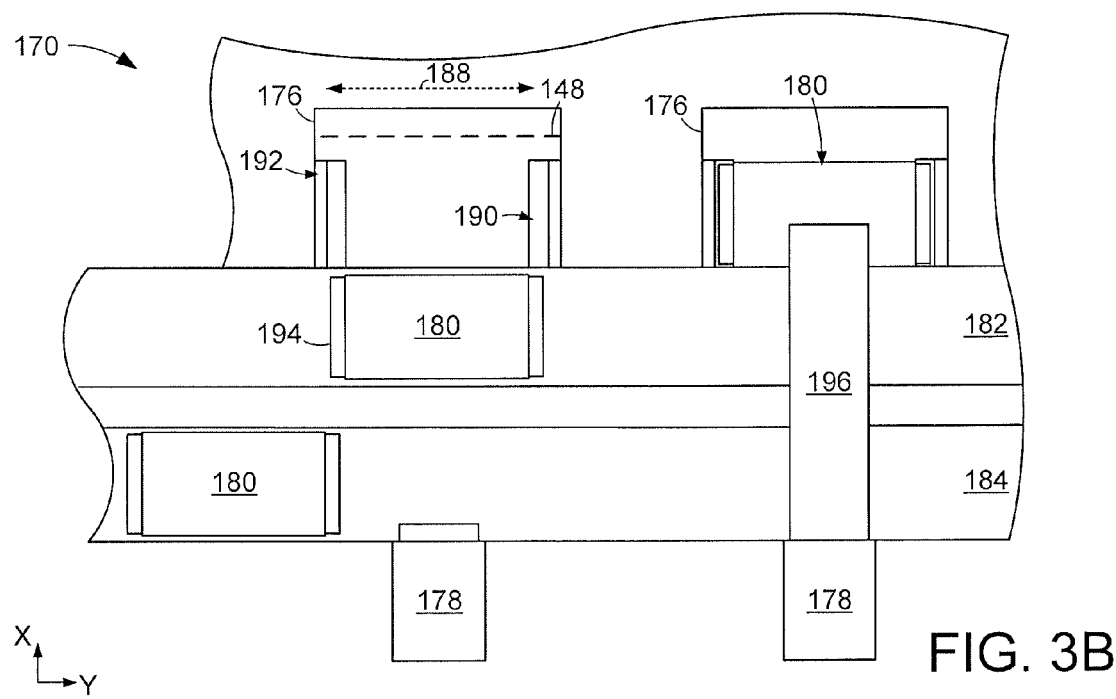

FIGS. 3A and 3B respectively provide side and top view line representations of portions of an example data component testing system 170 that can test data components in accordance with various embodiments. The testing system 170 has a testing region 172 that houses a plurality of test racks 174 that each have multiple test slots 176 arranged vertically, as shown in FIG. 3A. It is contemplated that the testing region 172 has overall heating, cooling, and air filtration capabilities that can complement the heating and cooling capabilities of the individual testing slots 176. That is, the testing region 172 is capable of providing environmental conditions that are different from the testing environment in the respective test slots 176.

Various embodiments position a vertical actuator 178 in alignment with each test rack 174. The vertical actuator 178 can be configured with any number of end effectors, gears, solenoids, and belts to transport a test deck 180 along a vertical axis (Z axis). The vertical actuators 178 can be configured with means of engaging a test deck 180 delivered by a test conveyor 182, moving the test deck 180 to a selected test slot 176, installing the test deck 180 into the electronic communication with the test slot 176, removing the test deck 180 from the test slot 176, and delivering the test deck 180 to a return conveyor 184. Hence, the vertical actuators 178 can each operate in concert with the test 184 and return 182 conveyors to provide multiple axes of test deck 180 articulation.

It is noted that the vertical actuators 178 and conveyors 182 and 184 can be configured to rotate a test deck 180, such as with an end effector. However, such test deck 180 rotations can take time that could be more efficiently spent performing the testing operation of each test slot 176 in the test rack 174. Hence, the conveyors 182 and 184 are arranged to maintain a test deck 180 in a predetermined position where a longitudinal (long) axis 186 of the test deck 180 is continuously parallel with a longitudinal axis 188 of the test slots 176. While it is contemplated that various test slots 176 are arranged with different longitudinal axis 188 orientations within the testing region 172, various embodiments position each test slot 176 in the testing region 172 so that the longitudinal axis 188 is aligned parallel with the Y axis.

The position of the respective test slots 176 along with the configuration of the vertical actuators 178 and conveyors 182 and 184 allows a test deck 180 to be delivered to and removed from a test slot 176 without being rotated, which saves time and mechanical complexity. The respective test slots 176 can be configured to complement the continuous alignment of the test deck 180 and test slot 176 longitudinal axes by providing electronic connections 190 that protrude from opposite test slot walls 192. Positioning the electronic connections 190 on lateral sides of the test slot 176 facing upwards, along the Z axis, allows gravity to assist the installation of a test deck 180 into the test slot 176 to form a electronic testing connection.

FIG. 3B conveys a top view of a portion of the testing region 172 that illustrates the alignment of a test deck 180 longitudinal axis 186 with the longitudinal axis 188 of the test slot 176. The top view also shows how the electrical connections 190 of the test slot 176 can be arranged to receive test deck electrical protrusions 194. It is noted that the type, number, and position of the electrical connections 190 of the test slot 176 and electrical protrusions 194 of the test deck 180 are not limited to a particular configuration. As such, the test deck 180 may have more, less, and different types of electrical connections, such bus, pin, and pad connectors, than the test slot 176.

Regardless of the number and type of respective electrical connections 190 and 192, the position of the connections 194 on opposite longitudinal sides of the test deck 180 and connections 190 and 192 on opposite sides of the test slot 176 allows for simple and efficient installation and removal of the test deck 180. For example, an end effector 196 portion of the vertical actuator 178 can quickly connect a test deck 180 with a test slot 176 by sliding the test deck 180 and dropping the test deck 180 onto the electrical connections 190. In contrast, a rear mounted test slot electrical interface, as displayed by segmented line 198, requires increased test deck 180 vertical alignment precision and X axis application of force that may damage the interface 198 and/or test deck 180 in the event of misalignment.

Figure 4:
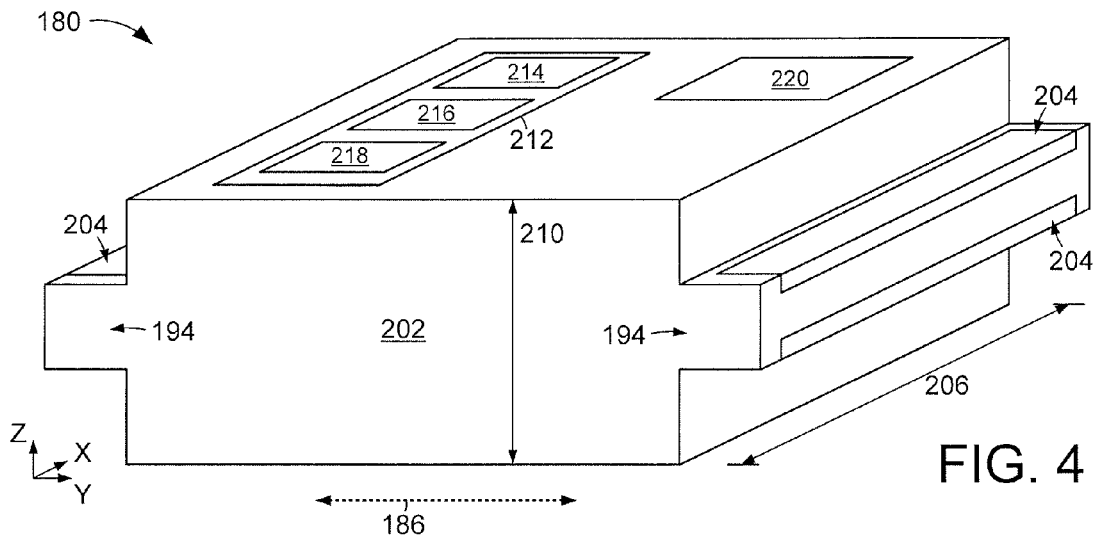
FIG. 4 provides an isometric view line representation of a portion of an example test deck capable of being utilized in an example data storage component testing system.

FIG. 4 displays an isometric view line representation of a portion of an example test deck 180 with electrical protrusions 194 extending from opposite longitudinal sides of the deck cover 202. It is contemplated that the electrical protrusions 194 are dual sided and have electrical pads and/or pins 204 facing opposite directions along the Z axis, but such configuration is not required as single-sided electrical configurations can be utilized.

The electrical protrusions 194 may be integrated into the deck cover 202 or may be a sleeve or cover that fastens or adheres to the deck cover 202 to translate electrical connectivity to and from a test slot. The electrical protrusions 194 are configured, in some embodiments, to wholly support the weight of the test deck 180. That is, the deck cover 202 can be suspended between support surfaces of the test slot, as shown in FIG. 3B. The electrical protrusions 194 can be arranged with alignment and/or sliding features that aid in the installation and removal of the test deck 180. For instance, the electrical protrusions 194 can have flexible or rigid rails or grooves as well as bearings or smooth surfaces to facilitate efficient and reliable test deck position to form a testing connection between the test slot 176 and test deck 180.

Although not required or limiting, the electrical protrusions 194 are each configured to continuously extend to match a depth 206 of the deck cover 202. In some embodiments, the electrical protrusions 194 have a depth that is smaller than the cover depth 206. The electrical protrusions 194, as shown, have a protruding distance 208 that is smaller than the height 210 of the deck cover 202. The protruding distance 208 can be tuned to provide adequate surface area to present the electrical means 204 and to physically suspend the deck cover 202 between test slot wall protrusions 192. It is noted that the deck cover 202 may be a single unitary piece of material or an assembly of multiple pieces that provide an internal test environment where a single data storage medium, data transducing head, and head suspension are positioned to test at least one data storage component.

At least one printed circuit board assembly (PCBA) 212 can be implemented into the deck cover 202 and populated with any number of computing control means, like a controller 214, local memory 216, and sensor 218. The ability to provide local computing control means allows the test deck 170 to facilitate the execution of a test routine with local data logging and sensed feedback, such as vibration, temperature, humidity, and proximity feedback from the sensors 218.

The local computing control means further allows the test deck 180 to log and monitor test results to determine if a data storage component being tested is good, defective, a poor performer, or an optimized performer. For example, the local controller 214 can perform a test to qualify a slider, HGA, or data storage medium as good or bad as well as how optimized the combination of components is, which can allow a testing system to optimize the placement of data storage components in data storage devices.

The test deck 180 can be configured to repeatedly interchange data storage components, like a slider or HGA, while maintaining other data storage components, such as keeping the same actuator and data storage medium. The interchanging of data storage components can be facilitated with an access port 220 that allows individual data storage components to be engaged, removed, and installed without having to disassemble the deck cover 202. The access port 220 can be selectively closed and opened via one or more doors, latches, hinges, and plates that can be cyclically opened and closed in the course of component interchange and testing.

The configuration of the test deck 180 with a rectangular shape where the electrical protrusions 194 extend from opposite longitudinal sides of the deck cover 202 provides ample surface area for a conveyor to engage and move the test deck 180 along a lateral direction and a vertical actuator to engage and move the test deck 180 along a vertical direction. It is noted that the longitudinal axis 186 of the test deck 180 is perpendicular to a short axis that is parallel to the X axis and depth 206.

Figure 5:
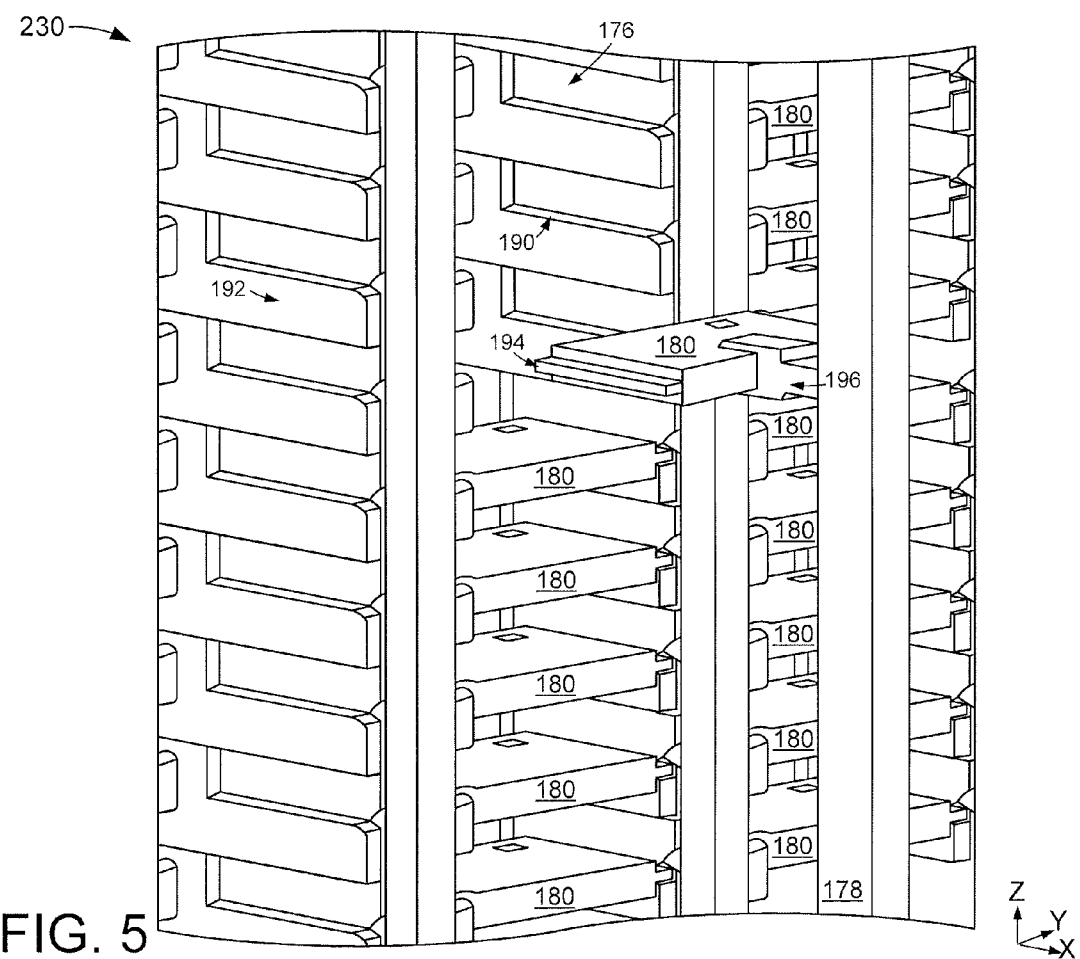
FIG. 5 illustrates a line representation of a portion of an example data component testing system operated in accordance with various embodiments.

FIG. 5 illustrates a perspective view line representation of a portion of an example data storage component testing system 230 where multiple test decks 180 are being concurrently tested in accordance with various embodiments. As shown, an end effector 196 of a vertical actuator 178 is moving a test deck 180 into contacting engagement with a test slot 176. The testing system 230 conveys how a plurality of test decks 180 can be positioned in the respective test slots 176 with electrical protrusions 194 suspending the deck cover 202 between the electrical connections 190 and slot wall protrusion surfaces 192 of the test slot 176. The tuned configuration of the test slot electrical connections 190 and test deck electrical protrusions 194 allows the end effector 196 and vertical actuator 178 to more easily and quickly install the test deck 180 into the test slot 176 compared to if the deck cover 202 contacted one or more supporting surfaces.

Moreover, positioning the test slot and deck electrical connecting means on opposite longitudinal sides allows the vertical actuator 178 to move, install, and remove a test deck 180 without rotation in the X-Y or Z-Y planes. The elimination of test deck 180 rotation during transit to and from a test slot 176 allows the vertical actuators 178 and lateral conveyors to efficiently service the multitude of test slots 176 and maximize testing efficiency of the testing system 230. For example, the elimination of test deck 180 rotation can allow the vertical actuator 178 to engage more test decks 180 and test slots 176 over time, which decreases the non-testing downtime of the respective test slots 176 in the testing system 230. Also, the elimination of test deck 180 rotation allows test deck testing to be more lengthy and sophisticated due to the increase in test slot 176 access times by the vertical actuator 178.

Figure 6:
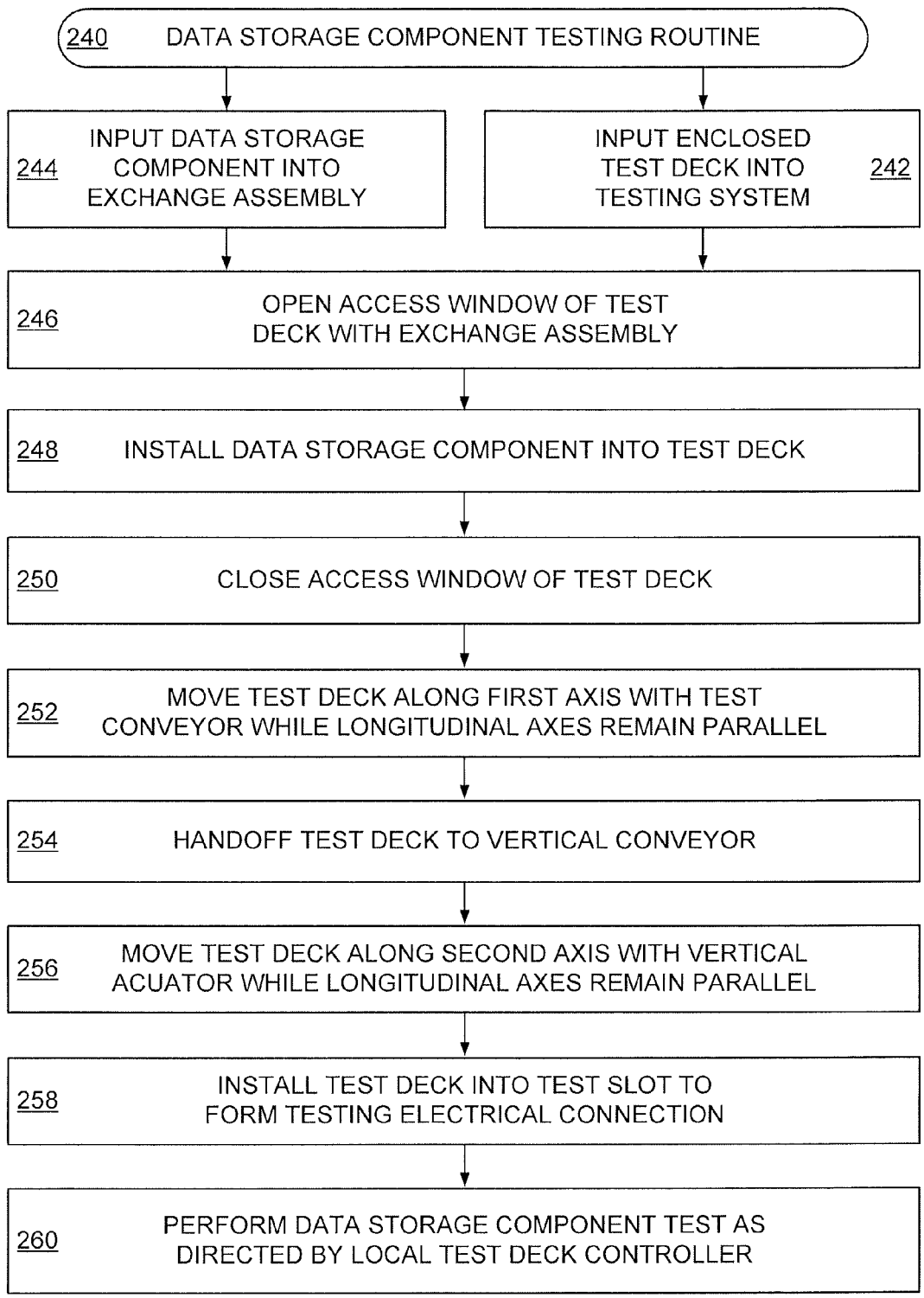
FIG. 6 is an example data storage component testing routine carried out in accordance with some embodiments.

An example data storage component testing routine 240 is provided in FIG. 6 that can optimize the testing of data storage components by eliminating test deck rotation during transit to and from a test slot. It is noted that the testing routine 240 employs a test deck, such configuration is not required as a data storage device, such as a hard disk drive, can be utilized in accordance with various embodiments. Initially, a test deck is inputted into a testing system in step 242 before, during, or after a data storage component is inputted into an exchange assembly in step 244. The test deck can be populated with less than all the data storage components needed to conduct data writing and/or reading operations.

The exchange assembly proceeds to open an access port of the test deck in step 246 and subsequently install a data storage component into the test deck in step 248, which produces an operating testing environment that is wholly enclosed in the test deck with the closure of the access port in step 250. It is to be understood that the test deck is initially and continuously positioned during steps 242-250 with the longitudinal axis of the test deck oriented parallel to a longitudinal axis of the test. The parallel orientation of the test deck and test slot is maintained during step 252 where at least one conveyor moves the test deck towards the testing region and test slot without rotating the test deck. A handoff of the test deck to the vertical actuator occurs in step 254 prior to the test deck being moved proximal a selected test slot in step 256 while the longitudinal axes of the test deck and slot remain parallel.

It is contemplated, but not required, that the conveyor of step 252 operates in a first (horizontal) axis and the actuator of step 256 operates in a second (vertical) axis. Once the vertical actuator moves the test deck into position proximal a test slot, step 258 installs the test deck into the test slot with an end effector portion of the vertical actuator. The installation of the test deck comprises physically moving the test deck into the test slot and physically contacting electrical connection means of the test deck with the test slot. As illustrated in FIGS. 3A-5, the test deck can have protruding rails that have electrical connections positioned to mate with electrical connections located on slot protrusions extending from opposite longitudinal sidewalls of the test slot.

The electrical connection between the test deck and test slot allows step 260 to perform at least one data storage component test as directed by the local test deck controller. For example, the local test deck controller can direct the test slot to adjust environmental conditions, such as providing a heated or cooled test slot environment, or an alternative gas atmosphere, like He or another inert gas, or a sub-atmospheric pressure, and direct the test deck to execute various testing procedures, such as writing and/or reading test data patterns, for a variety of operating conditions, such as different heater profiles and skew angles with respect to the underlying data storage medium. It is noted that the testing routine 240 is not required or limiting as various aspects can be changed and removed just as steps and decisions can be added. For instance, assorted embodiments may perform portions of the routine 240 backwards to remove a test deck from a test slot prior to returning the test deck to an exchange assembly without rotating the test deck relative to the test slot.

Through the configuration of the various aspects of a testing system, rotation of a test deck is eliminated and testing efficiency is optimized. That is, maintaining continuous parallel orientation of the test deck and a test slot decreases the amount of time a loader assembly takes to install and remove test decks into an array of test slots. The decreased transit time afforded by the elimination of test deck rotation allows the test deck to incur longer and more sophisticated testing routines without decreasing the tested data storage component throughput of the system.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. A method for testing data storage components housed in a test deck, the method utilizing a testing assembly and a loader assembly, the method comprising:

transporting, via the loader assembly, a first test deck to a first test slot of a plurality of test slots in the testing assembly, each test slot having long and short axes, the first test deck having a long axis that is continuously maintained parallel to the long axis of the first test slot during the transportation step;

opening an access port of the first test deck with an exchange assembly prior to installing a data storage component into the first test deck;

installing the first test deck into the first test slot with the loader assembly without substantially rotating the first test deck and while the long axis of the test slot and test deck remain substantially parallel; and performing a test routine within the first test slot.

2. The method of claim 1, wherein the first test deck forms at least one electrical connection with at least one connector of the first test slot via the installing step.

3. The method of claim 1, wherein the test routine writes at least one data pattern to a data storage medium housed in the first test deck.

4. The method of claim 1, wherein the first test deck is installed by an end effector of the loader assembly.

5. The method of claim 1, wherein the loader assembly comprises at least one conveyor and at least one vertical actuator, the at least one conveyor operating only in a horizontal plane and the at least one vertical actuator operating only in a vertical plane.

6. The method of claim 1, wherein the controller determines a data storage component of the first test deck passes the routine and grades the performance of a computing combination in the first test deck that comprises the data storage component.

7. The method of claim 1, wherein a second test deck is performing the test routine in a second test slot while the first test deck performs the test routine in the first test slot.

8. The method of claim 7, wherein the first test deck is at a different progression point of the test routine than the second test deck.

9. The method of claim 1, wherein a second test deck is being transported to a second test slot while the first test deck performs the test routine.

10. The method of claim 1, wherein the controller determines a data storage component of the first test deck is defective as a result of the test routine.

11. The method of claim 10, wherein the exchange assembly closes the access port prior to the loader assembly moving the first test deck, the exchange assembly maintaining the parallel alignment of the long axes of the first test slot and first test deck.

12. The method of claim 1, wherein the first test deck is electrically mated to the test slot via gravity.

13. A method for testing data storage components housed in a test deck having rails extending from the test deck, wherein the rails include electrical contacts, wherein the method utilizes a testing assembly having a plurality of testing slots, the method comprising:
   transporting, via a loader assembly, a test deck to a test slot of a plurality of test slots in the testing assembly,
   opening an access port of the test deck with an exchange assembly prior to installing a data storage component into the test deck;
   positioning the test deck into a test slot with the loader assembly;
   forming an electrical connection between at least one of the electrical contacts of the test deck rails and the test slot by lowering the test deck, via the loader assembly, such that the electrical contact of the rails connects to an electrical contact of the test slot; and
   testing at least one of the data storage components housed in the test deck positioned in the test slot.

14. The method of claim 13, wherein the plurality of test slots are vertically aligned and accessed by a vertical actuator.

15. The method of claim 13, wherein the test deck has electrical contact protrusions extending from opposite sides of a deck cover along a long axis of the test deck.

16. The method of claim 15, wherein the electrical contact protrusions are each configured to match first and second wall protrusion of the test slot, the wall protrusions respectively extending from opposite sides of the first test slot along the long axis of the test slot.

17. The method of claim 13, wherein the test deck is filled with He at a sub-atmospheric pressure.

18. A method for testing data storage components housed in a test deck, the method comprising:
   transporting, via a loader assembly, the test deck to a test slot of a plurality of test slots in a testing assembly, the test deck comprising a local controller and memory;
   opening an access port of the test deck with an exchange assembly prior to installing a first data storage component into the test deck;
   installing the test deck into a test slot with the loader assembly;
   performing a first test routine within the test slot as directed by the local controller;
   logging results of the first test routine with the local controller and local memory;
   exchanging the first data storage component with a second data storage component;
   executing a second test routine on the test deck as directed by the local controller.

19. The method of claim 18, wherein the local controller compares results of the first and second test routines to optimize data storage performance, the first and second data storage components each being qualified as good.

* * * * *